Oct. 31, 1939.  W. G. H. FINCH  2,178,394
TELEPICTURE SYNCHRONOUS DRIVING SYSTEM
Filed Dec. 17, 1936  2 Sheets—Sheet 2

INVENTOR
William G. H. Finch
BY
Samuel Ostrolenk
ATTORNEY

Patented Oct. 31, 1939

2,178,394

UNITED STATES PATENT OFFICE 2,178,394

TELEPICTURE SYNCHRONOUS DRIVING SYSTEM

William G. H. Finch, New York, N. Y.

Application December 17, 1936, Serial No. 116,302

2 Claims. (Cl. 178—69.5)

This invention relates to synchronizing systems and more particularly relates to novel methods of and apparatus for maintaining a remote telepicture receiver in alignment with the transmitter.

Prior synchronizing systems employed special synchronizing impulses transmitted cyclically at the end of each line of scanning to maintain a receiver scanning mechanism in proper synchronous phase relationship with the transmitter by start-stop operation. Other systems employed a special carrier frequency transmitted over the signalling channel for controlling the synchronous operation of the receiver.

My present invention is of the class employing means local to the receiver station for maintaining the synchronous operation independent of any continuous or cyclic synchronizing signals from the transmitting station. Prior systems of the latter class depend upon clock, chronometer or tuning fork control of a resistor connected in the field winding of a direct current motor for cutting the resistor in or out of the field to maintain a substantially constant or average speed for the receiver driving motor. However, the torque of the motor of such a system necessarily varies or wobbles about the mean torque. The receiver scanner accordingly maintains a practical and operative synchronous relation with the transmitter, but the quality and ultimate detail of the picture is affected. The minute variations due to the variable torque corrections are reflected by corresponding minute distortions of the picture detail and result in a picture reproduction inferior to the corresponding picture produced if the speed were perfect and without the minute variations. My present invention is directed toward eliminating the minute torque or speed variations at the receiver in order to obtain more perfect picture detail for a given number of lines of scanning per inch.

Another prior synchronizing system comprised a relatively small alternating current synchronous control motor coupled to a common shaft with the main motor driving the facsimile receiver. The main motor was usually a direct current motor designed to operate close to the predetermined synchronous speed. The alternating current control motor was operated at synchronous speed. The torque developed by the synchronous motor of this modification was proportional to the amount which the direct current motor deviated from the predetermined synchronous speed. Since the torque developed by a synchronous motor is proportional to the angular phase displacement of the rotor with respect to the stator magnetic field, a definite angular phase shift was necessary for the control motor to become effective in correcting deviations of the main direct current motor from synchronous position. The operation of such a system resulted in a wavy or wobbly picture line synchronism and was in many instances accompanied by hunting conditions in the drive system. The detail of a picture produced by such operation was correspondingly affected. A modification of a direct current motor drive having a directly coupled synchronous controller motor resided in using a single motor housing a double set of windings corresponding to the main direct current motor and the auxiliary synchronous motor in combination.

A further prior art synchronous control telepicture synchronizing system employs a tuning fork driving a phonic motor. Good results are obtainable with such a system but relatively expensive precision apparatus of special design for the picture system is required.

In accordance with my present invention, I contemplate employing standard electrical components for a synchronizing system which does not require received synchronizing signals. A pre-calibrated self-driving tuning fork is used to generate a standard power frequency signal, for example a sixty cycle signal, corresponding to the frequency of operation of a standard synchronous motor. The accurate sixty cycle signal is amplified by electronic power amplifying means to produce sufficient energy to directly drive the sixty cycle synchronous motor of the telepicture unit. The synchronous driving system of my present invention is operative directly from a power supply source of any type, for example, direct current or alternating current of any commercial frequency. I employ a condenser pack connected in parallel with the synchronous motor in order to make possible its being driven by the output current of the power amplifier as will be hereinafter described in more detail.

The driving system of my present invention is free from any hunting or even minute torque or speed variations. This system may be applied to the transmitter or receiver in order to independently drive both ends of a telepicture transmission system. The resultant picture at the receiver will be free of even minute variations in the predetermined synchronous phase position of any portions thereof. I have found that the quality of such a picture is immensely improved as compared to the similar results obtained by any of the prior art systems using equivalent lines per inch of scanning. Very fine news print may accordingly be transmitted by telepicture systems employing my present invention at one hundred lines per inch and be accurately readable at the receiving end. By using the accurate synchronous drive for improving the picture detail, reproductions of a given quality may be transmitted in materially shorter time due to the lower number of lines per inch of scanning required.

It is accordingly an object of my present invention to provide a novel synchronizing system and apparatus therefor operative independently of synchronizing signals.

Another object of my present invention is to provide a novel method of and apparatus for operating a synchronous motor drive for either end of a telepicture system.

A further object of my present invention is to provide a novel method of and means for operating a telepicture receiver in synchronism with the transmitter without hunting, speed or torque variations.

These and further objects of my present invention will become apparent in the following description taken in connection with the drawings, in which.

Figure 1:
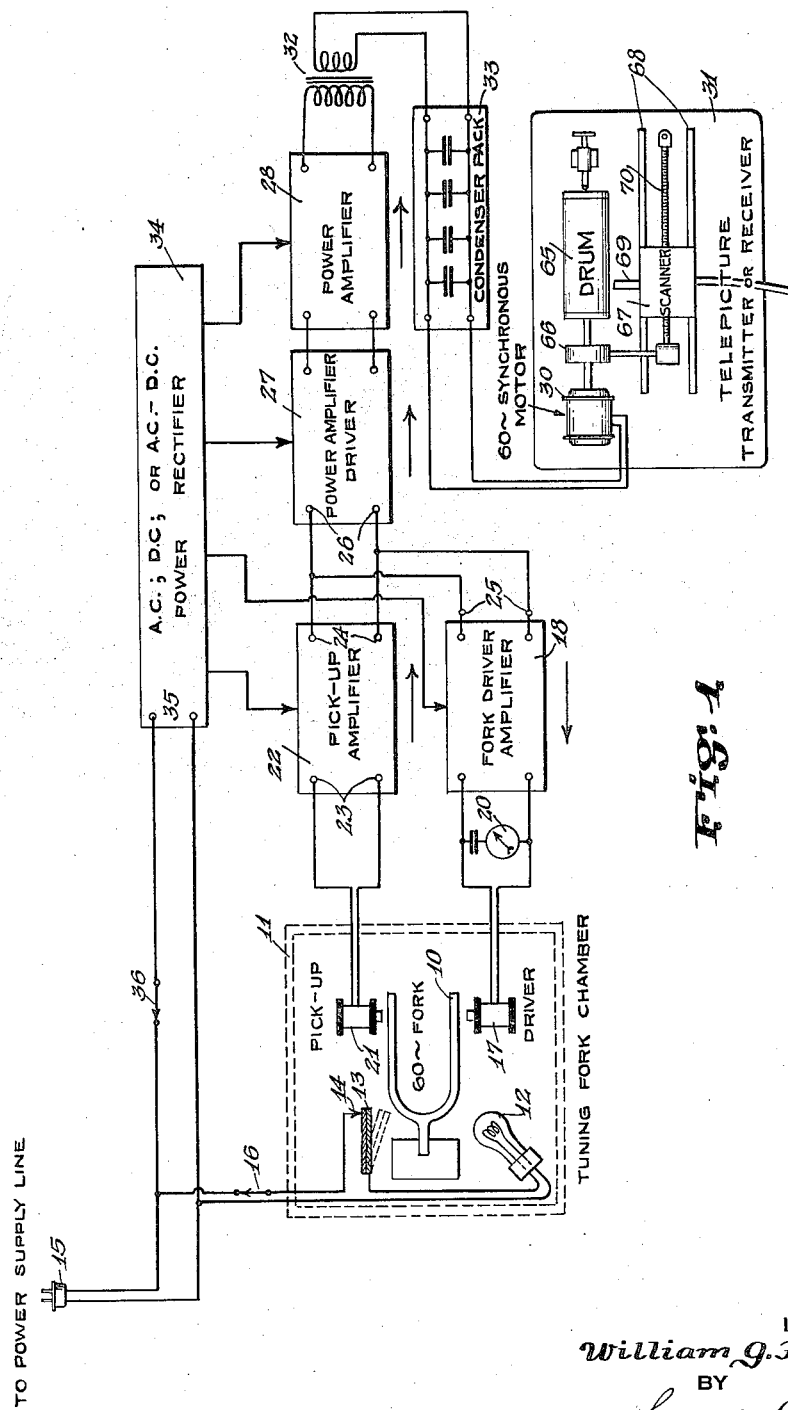
Figure 1 is a schematic diagram of the synchronous driving system directly operative from any power supply.

The tuning fork 10 is enclosed in a thermal insulation chamber 11. The walls of chamber 11 may be of "Celotex" or other insulation material. A resistance or electric lamp 12 is placed within chamber 11 to maintain the temperature therein at a predetermined value corresponding to the calibration temperature of the tuning fork 10. A bi-metallic thermostat 13 is designed to open the switch 14 when the temperature in tuning fork chamber 11 rises above a predetermined value. The thermostat switch 14 and the heating lamp 12 are connected in series to the plug 15 connectible to the power supply line. A switch 16 is used to start the heating or temperature regulation of the tuning fork independently of the remainder of the system in order to obtain stability of heat conditions before operation in picture transmission.

A solenoid 17 is used to drive or vibrate the tuning fork at its normal mode of operation. The driver solenoid 17 is connected to the output of a fork drive amplifier 18 energized in a manner to be described. The fork drive amplifier operates at the natural speed of vibration of the fork. A voltmeter 20 is connected to the output of amplifier 18 to insure proper operating conditions for the driver solenoid 17. I have found that the power input to the solenoid 17 is critical for a particular fork and solenoid combination and must be carefully watched within predetermined limits for satisfactory operation.

The tuning fork 10 vibrates at a predetermined frequency. A pick-up solenoid 21 is positioned near one tongue of the fork 10. Variations in the magnetic path of solenoid 21 produces corresponding curent variations in solenoid 21 which are introduced to the input 23 of pick-up amplifier 22. The output 24 of pick-up amplifier 22 is of the same frequency as the tuning fork frequency and is introduced to the input 25 of the fork driver amplifier 18. The self-driving action of the tuning fork arrangement is accomplished by electronic amplification and results in a regenerative action once the fork 10 starts vibrating. The driver solenoid 17 maintains the vibration of fork 10 and the pick-up solenoid 21 faithfully picks-up the predetermined vibration frequency which is amplified by amplifier 22.

The output 24 of pick-up amplifier 22 is also connected to the input 26 of the power amplifier driver 27. The power amplifier driver amplifies the currents of the predetermined frequency to a degree sufficient to excite the input of the power amplifier 28. The output of power amplifier 28 is coupled to the synchronous motor 30 of the telepicture unit 31 by a suitable transformer 32 and a condenser pack 33.

The energization of the electronic amplifiers is accomplished by the schematically indicated power rectifier 34. The input 35 of rectifier 34 is connectible through switch 36 to the power plug 15 and the power supply line. The telepicture unit 31 may well be a portable one. The synchronous drive system therefor is accordingly also made portable. The synchronous drive for this system is independent of the nature of the power supply source. It is only necessary to design the power rectifier to be operative from the type of power source likely to be encountered. Where alternating current power supplies are available, an alternating current power pack is sufficient. Since the system does not depend on the synchronizing frequency of any local power source, the frequency of the alternating current systems may be twenty-five, fifty, sixty or any other value. Where the telepicture unit is to be operated from a direct current power source, the power rectifier is correspondingly designed to operate from direct current energization in a manner well known to those skilled in the art. It is also possible to design the power rectifier 34 to be operative from either alternating current or direct current by employing the well-known A. C.–D. C. circuits for rectification.

The frequency of vibration of the fork 10 should correspond to the normal frequency of operation of the synchronous motor 30. I have illustrated a sixty cycle operation in the diagrams but it is to be understood that different frequencies of operation may equally well be employed. The frequency of operation of the synchronous motor 30 is independent of the frequency of the power supply source but is directly controlled by the constant temperature tuning fork 10. Similar systems may be used at both the transmitter and receiver units of a telepicture intercommunications system. Any number of receiver units may be used in conjunction with a transmitter. The receiver units may be located at any distance from the transmitter where the picture signals may be received. It is only necessary to precalibrate the tuning forks corresponding to fork 10 for each unit and maintain the respective tuning fork chambers at the predetermined temperature.

It is necessary to use a condenser pack 33 to correct for the lagging phase angle of the current output from the electronic power amplifier 28. When the uncorrected output of the power amplifier 28 is connected to the synchronous motor 30 no torque can be developed by the motor due to the substantial out-of-phase relationship between the voltage and current from the amplifier. I have found that a condenser pack 33 connected in parallel across the synchronous motor will permit normal driving operation for the motor. By using a proper amount of capacitance, the power factor of operation of the motor 30 may be made equal to one-hundred per cent to insure normal operation thereof. I prefer to connect the condenser pack at the secondary side of the output transformer 32 since lower voltage condensers can be used to reduce the cost of the condenser pack 33. However, it is equally feasible to connect the condenser pack across the primary side of transformer 32 where a higher voltage is generally employed.

Figure 2:
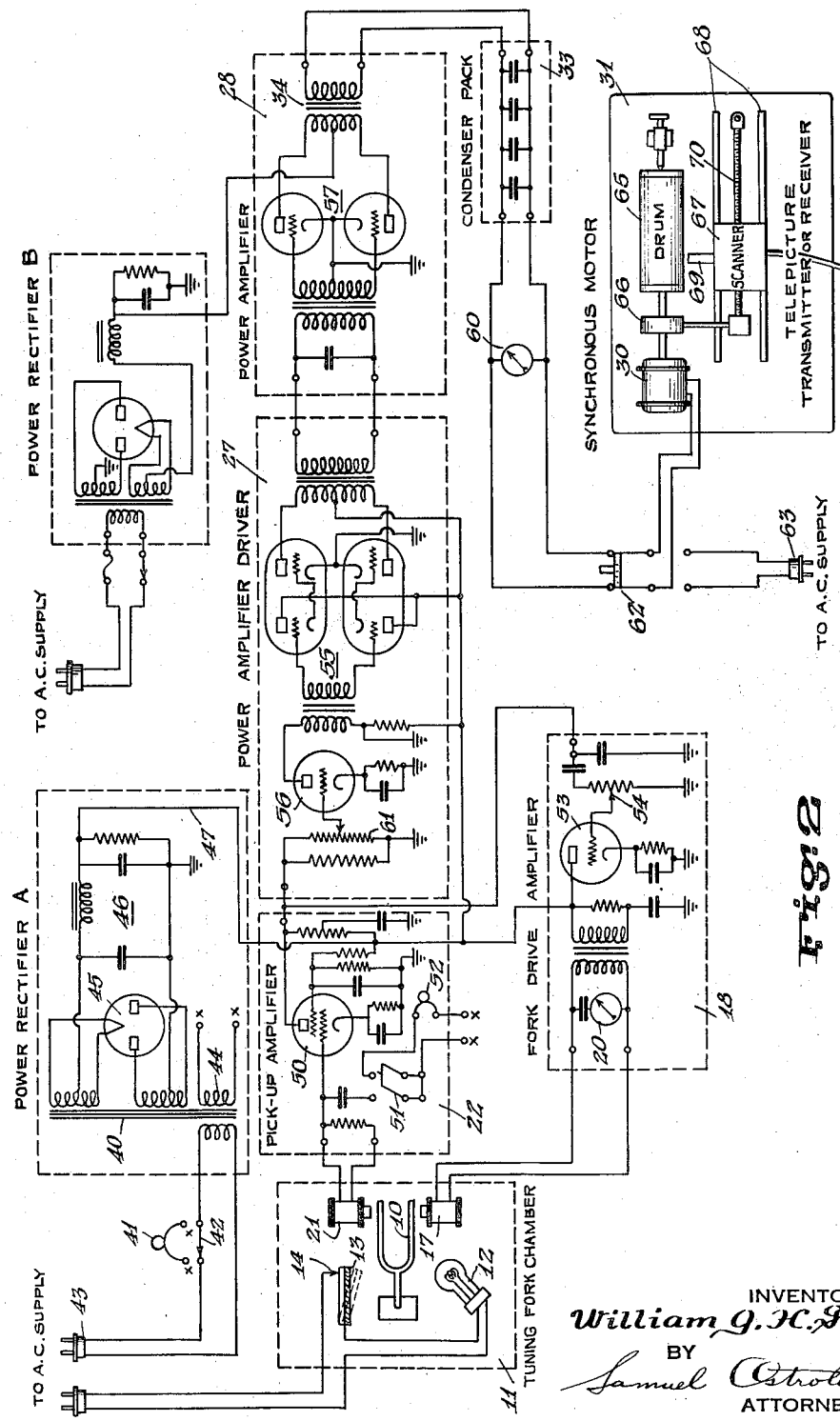
Figure 2 is a diagrammatic representation of a preferred embodiment of my present invention operative directly from an alternating current power supply.

Figure 2 is a diagrammatic illustration of a preferred circuit arrangement for operating a telepicture unit from an alternating current supply source. The dotted rectangular units correspond to the similarly labelled units of Figure 1 but enclose specific circuital arrangements. In this modification a separate power rectifier is used for the power amplifier unit 28. Power rectifier A supplies the anode currents for the pickup amplifier 22, the power amplifier driver 27 and the fork drive amplifier 18. The heater current supply for the amplifier stages is not illustrated but may be supplied from the rectifier transformer 40 or by a separate heater transformer. A pilot lamp 41 is located adjacent the switch 42 which energizes the transformer 40 from the A. C. supply connectible to plug 43. The $x$—$x$ marks at the pilot lamp 41 terminals are connected to the $x$—$x$ marks at the terminals of transformer winding 44 but have not been drawn in to simplify the diagram. The full wave rectifier 45 is energized by transformer 40. A filter 46 smoothes the rectifier output current and supplies the anode circuit through the anode current lead 47.

The pick-up amplifier 22 contains a screen grid amplifier stage 50. A double pole switch 51 completes the input circuit to the amplifier 50. A pilot lamp 52 is connected through the $x$—$x$ terminals to the winding 44 when switch 51 is closed to indicate to the operator when the amplifier units are operating by the fork signal.

The fork drive amplifier 18 consists of a single triode stage 53 of amplification. The input to the grid of stage 53 is connected to a potentiometer 54 to control the voltage output of the amplifier 18 in a well known manner. The voltage indicated by output meter 20 is necessarily kept within the critical limits as already described.

The tuning fork chamber 11 is similar to the chamber already described and maintains the vibrating fork 10 at a substantially uniform heat condition and frequency.

The power amplifier driver 27 contains a push-pull stage 55 of electronically coupled amplification, driven by a triode stage 56. The output of push-pull stage 55 is connected to the triode push-pull power amplifier stage 57. The power amplifier stage 57 is operated at a higher voltage than the other amplifier stages and an independent power rectifier B is employed to energize this unit.

A step-down transformer 32 couples the high voltage power amplifier tubes 57 to the condenser pack 33. An output voltage of 110 volts and a current of one ampere is sufficient for all ordinary purposes for the synchronous motor 30 operation of the telepicture unit. The condenser pack 33 in a particular apparatus totaled forty-eight microfarads of capacitance when connected across a synchronous motor 30 operating on 110 volts and one ampere. A voltmeter 60 is connected to the output of condenser pack 33. The amplification of the amplifiers is controlled to obtain the proper voltage condition for motor 30. Potentiometer 61, connected to the input of the power amplifier driver 27, may be used to control this voltage condition.

The design of all the amplifier units of my present invention is directed toward most efficiently amplifying the fundamental fork frequency and simultaneously suppressing all other frequencies particularly the harmonic frequencies. In the preferred embodiment, the amplifiers are preferably designed to be most efficient at about sixty cycles. However, the amplifiers may have a frequency characteristic most favorable to frequencies below one hundred cycles so that amplification of frequencies above one hundred cycles, which would necessarily include the harmonic frequencies of sixty cycles, will be relatively attenuated.

A double pole, double throw, starting switch 62 is preferably used to connect the thermionic sixty-cycle current to the motor when the voltage conditions at meter 60 are suitable. The switch 62 may also be used to start up the synchronous motor 30 from a local sixty-cycle source connected to plug 63. Motor 30 is preferably of the self-starting type and the plug to A. C. supply may be used to drive the motor for any test or warming up conditions. When transmission or reception of a picture is to take place, switch 62 transfers the motor 30 from the power supply to the electronic synchronous current supply.

When the transmitter and receiver units are located in the same vicinity and are readily connectible to a common alternating current source, the motor 30 may be operated directly from the A. C. supply by connecting the switch 62 thereto since both the transmitter and receiver remote units will be energized from the same power station at the power station frequency.

The telepicture transmitter or receiver schematically illustrated at 31 is drawn to represent any telepicture or facsimile transmitter or receiver employing an electrical motor drive. The system schematically indicated may for example, be the one described in my Patent No. 2,047,863, issued July 14, 1936. The motor 30 is directly coupled to the drum 65 by reduction gearing 66 in order to drive the drum at a suitable lower speed with respect to the motor. A speed of one hundred revolutions per minute for the drum is a satisfactory rate. The scanner 67 is mounted on a carriage which rides on tracks 68 parallel to the rotatable drum 65 and contains electro-optical means 69 for scanning the record sheet mounted on the drum. The scanner carriage is driven by a feed screw 70 directly driven from the reduction gearing 66 connected to the motor 30. The rate of feed of the scanner carriage may be one inch per minute. The resultant scanning rate for the record sheet will accordingly be one hundred lines per inch in this case. A flexible cable connects the electro-optical carriage to suitable amplifying equipment at the transmitter or receiver.

Although I have illustrated preferred circuit arrangements for carrying out my present invention, it will be evident that modifications falling within the broader spirit and scope thereof may be made by those skilled in the art and accordingly I do not intend to be limited except as set forth in the following claims.

I claim:

1. In a synchronous system for a telepicture scanner, mechanism operable at a predetermined synchronous speed with a remote mechanism independent of any synchronizing pulses, a synchronous motor, a positive drive connection from said motor to said scanner mechanism for driving said scanner mechanism at said predetermined speed, said motor being normally operable by sinusoidal current of a predetermined frequency, means for locally generating a sinusoidal current of said predetermined frequency; means including current connections for operating said motor by said sinusoidal current comprising a thermionic amplifier system responsive to said currents for generating sufficient power to drive said motor; a power rectifier system operable from the local 60-cycle lighting and power supply, alternating or direct current, for suitably energizing said power amplifier system, means operable from said local 60-cycle lighting and power supply for maintaining said local sinusoidal generating means at a condition for generating said predetermined frequency whereby said scanner is driven at the synchronous speed with the remote scanner mechanism free of any synchronizing pulses from said remote scanner mechanism; and a capacitance connected in the output circuit of said amplifier system for correcting the phase relation of the power amplifier current applied to said motor with respect to the applied voltage to permit said synchronous motor to operate with normal characteristic conditions when driving said scanner mechanism.

2. In a synchronous system for a telepicture scanner mechanism operable at a predetermined synchronous speed with a remote scanner mechanism, independent of any synchronizing pulses; a synchronous motor for driving said scanner mechanism at said predetermined speed normally operable by sinusoidal current of a predetermined frequency; means including a tuning fork for locally generating a sinusoidal current of said predetermined frequency; means including circuit connections for operating said motor by said sinusoidal current comprising a thermionic amplifier system responsive to said currents from said tuning fork for generating sufficient power to drive said motor; means including circuit connections from said thermionic amplifier system for driving said tuning fork; a rectifier system operable from the local 60 cycle lighting and power supply, alternating or direct current, for suitably energizing said power amplifying system; a housing for said tuning fork sinusoidal current generating means; thermionic means operable from said local 60 cycle lighting and power system for maintaining said tuning fork in operable relation for generating said predetermined frequency whereby said scanner is driven at the synchronous speed with the remote scanning mechanism free of any synchronizing pulses from said remote scanner mechanism; and a capacitance connected in the output circuit of said amplifier system for correcting the phase relation of the power amplifier current applied to said motor with respect to the applied voltage to permit said synchronous motor to operate with normal characteristic conditions when driving said scanner mechanism.

WILLIAM G. H. FINCH.